US010236710B1

(12) United States Patent
de la Fuente (10) Patent No.: US 10,236,710 B1
(45) Date of Patent: Mar. 19, 2019

(54) STYLUS SECURING APPARATUS (71) Applicant: QuirkLogic, Inc., Calgary (CA)

(72) Inventor: Alfonso Fabian de la Fuente, Victoria (CA)

(73) Assignee: Quirklogic, Inc., Calgary (CA)

(*) Notice: Subject to any disclaimer, the term of this patent is extended or adjusted under 35 U.S.C. 154(b) by 58 days.

(21) Appl. No.: 15/385,520

(22) Filed: Dec. 20, 2016

(51) Int. Cl.
*H02J 7/00* (2006.01)
*H02J 7/02* (2016.01)
*G06F 3/039* (2013.01)
*G06F 3/0354* (2013.01)

(52) U.S. Cl.
CPC .............. *H02J 7/025* (2013.01); *G06F 3/039* (2013.01); *G06F 3/03545* (2013.01); *H02J 7/0044* (2013.01); *H02J 7/027* (2013.01)

(58) Field of Classification Search
CPC ........ H02J 7/025; H01F 38/14; Y02T 90/122; B60L 11/182; Y02E 60/12
USPC .......................................................... 320/108
See application file for complete search history.

(56) References Cited

U.S. PATENT DOCUMENTS

| 4,922,980 | A  | * | 5/1990  | Parker ...................... B41J 29/13 150/165 |
| 8,947,405 | B2 | * | 2/2015  | Cho ........................ G06F 1/1626 178/19.03 |
| 9,035,919 | B2 | * | 5/2015  | Cooke ..................... G06F 3/044 345/179 |
| 9,281,701 | B2 | * | 3/2016  | Large ..................... H02J 7/0044 |
| 9,511,903 | B2 | * | 12/2016 | Hurst ................. A45C 13/1069 |
| 9,513,671 | B2 | * | 12/2016 | Huston ................. G06F 1/1656 |
| 9,522,560 | B2 | * | 12/2016 | Paulick ................... B42F 9/001 |
| 9,545,147 | B2 | * | 1/2017  | Sadai ................... H04B 1/3888 |
| 9,568,954 | B2 | * | 2/2017  | Lauder ...................... H01F 7/04 |
| 9,575,572 | B2 | * | 2/2017  | Park ........................ G06F 3/041 |
| 9,577,697 | B2 | * | 2/2017  | Richmond |
| 9,585,600 | B2 | * | 3/2017  | Sharonov .................. A61F 2/82 |
| 2017/0083092 | A1 | * | 3/2017  | Levesque ................ G06F 3/016 |

* cited by examiner

*Primary Examiner* — Arun C Williams
(74) *Attorney, Agent, or Firm* — Chamberlain, Hrdlicka, White, Williams & Aughtry (57) ABSTRACT

An apparatus for housing and recharging a stylus (or stylus pen). The apparatus includes an elastic deformable holding sleeve which facilitates the placing and extraction of a stylus secured within a lumen of the apparatus. The stylus is further secured within the apparatus via magnetism. Additionally, or optionally, the apparatus includes an inductive recharging element, which in response to receiving direct current (DC) from an embedded battery, generates an electromagnetic field that couples with the inductive recharging circuit within a proximal stylus, thus providing electrical power or current to the secured stylus.

17 Claims, 9 Drawing Sheets

STYLUS SECURING APPARATUS

BACKGROUND

Mobile or portable computing systems, such as computer tablets and electronic book readers, are becoming ever more essential utilities for people on the go. As such, various accessories, which provide various extensions onto these devices, are more and more commonplace.

SUMMARY

In general, in one aspect, the invention relates to an apparatus for securing a stylus. The apparatus includes a holding sleeve attached at a first edge to a sleeve base, and a plurality of magnetized elements, wherein the plurality of magnetized elements is laterally spaced and disposed at least partially within a lining of the holding sleeve.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements, nor to limit any elements to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-3C, any component description with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to an apparatus for housing and recharging a stylus (or stylus pen). More specifically, in one or more embodiments of the invention, the apparatus includes an elastic deformable holding sleeve which facilitates the placing and extraction of a stylus secured within a lumen of the apparatus. In one or more embodiments of the invention, a stylus is further secured within the apparatus via magnetism. Additionally, or optionally, the apparatus includes an inductive recharging element, which in response to receiving direct current (DC) from an embedded battery, generates an electromagnetic field that couples with the inductive recharging circuit within a proximal stylus, thus providing electrical power or current to the secured stylus.

Figure 1A:
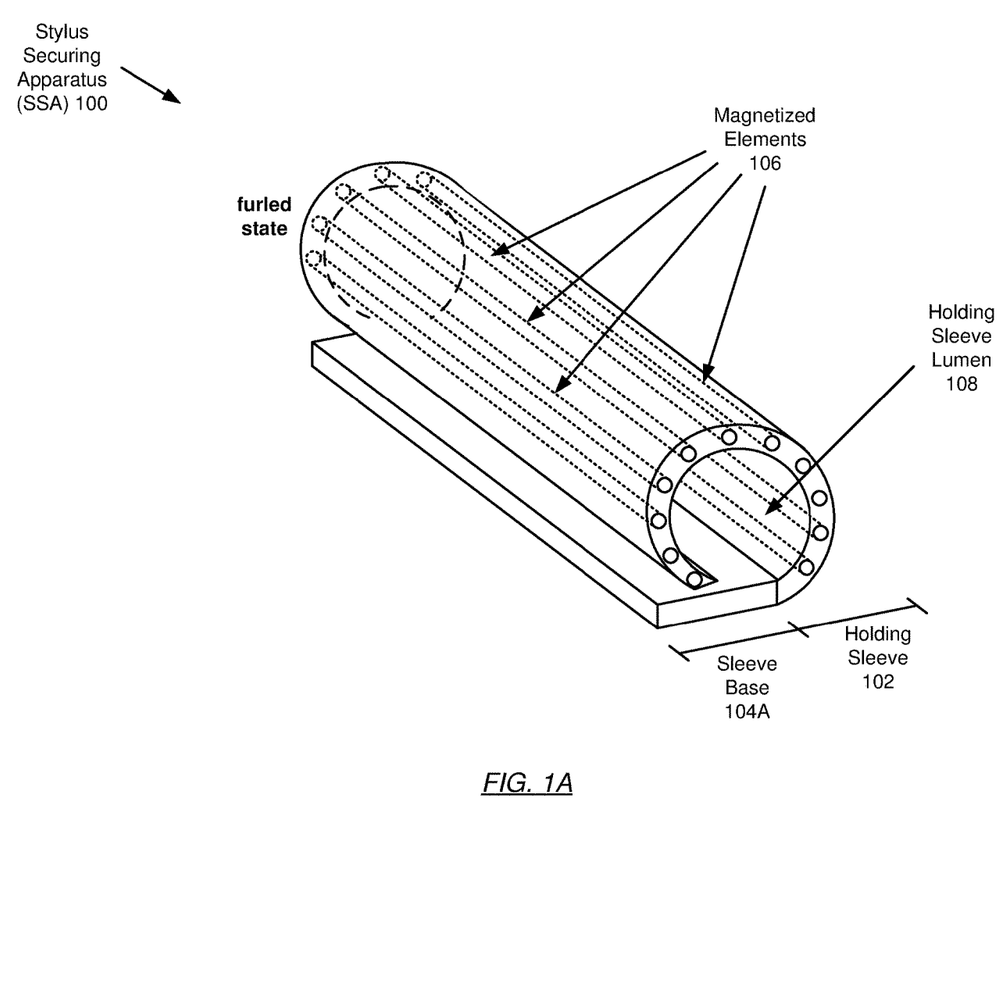
FIG. 1A shows a stylus securing apparatus in accordance with one or more embodiments of the invention.

FIG. 1A shows a stylus securing apparatus in accordance with one or more embodiments of the invention. In one or more embodiments of the invention, the stylus securing apparatus (SSA) (100) may be a flexible accessory that includes functionality to hold and protect a stylus (or stylus pen). In another embodiment of the invention, the SSA (100) includes further functionality to recharge an enclosed stylus via inductive (or wireless) charging (see e.g., FIG. 1E). In one or more embodiments of the invention, a stylus (or stylus pen) may be a pen-shaped instrument used to input commands to a computing system; examples of which include, but are not limited to: a computer screen, a computer tablet, a smartphone, a personal digital assistant (PDA), an electronic book reader, a handheld gaming system, and other equivalent portable/mobile computing systems. The SSA (100) includes a holding sleeve (102) and a sleeve base (104A). Each of these components is described below.

In one or more embodiments of the invention, the holding sleeve (102) may be an elastic deformable housing that envelopes the stylus. In one or more embodiments of the invention, elastic deformation refers to the deformation of an object when low stresses or forces are applied, and the object's return to its original shape when those stresses or forces are subsequently removed. As such, in one or more embodiments of the invention, the holding sleeve (102) may be at least partially constructed of self-reversing material that reverts to an original shape when forces, which may induce a temporary shape change in the holding sleeve (102), are no longer applied. Examples of such a self-reversing material include, but are not limited to: elastomers, rubbers, shape-memory alloys and/or polymers, smart materials, etc.

In one or more embodiments of the invention, the holding sleeve (102) may retain a furled, tubular structure as an original shape (e.g., a furled state). The furled, tubular structure creates a lumen (108) or an inside space/cavity within which a stylus may reside. In one or more embodiments of the invention, the stylus (not shown) may be further secured within the holding sleeve lumen (108) via magnetism. That is, in one or more embodiments of the invention, one or more magnetized element(s) (106) may be laterally spaced and disposed/embedded within the lining of the holding sleeve (102). These magnetized elements include functionality to attract the stylus towards themselves. Hence, in one or more embodiments of the invention, the magnetized elements (106) may be associated with one magnetic pole, while the stylus may be associated with an opposite magnetic pole, thereby compelling the attraction of polar opposites together. In one or more embodiments of the invention, the magnetized element(s) (106) may be fashioned of ferromagnetic materials such as iron, nickel, cobalt, or gadolinium. In another embodiment of the invention, the magnetized element(s) (106) may be fashioned of non-ferromagnetic materials, which become magnetized through exposure to a strong magnet during the manufacturing stage of the SSA (100). In one or more embodiments of the invention, the magnetized element(s) (106) may each extend along the length of the holding sleeve (102) (as depicted in FIG. 1A). In another embodiment of the invention, the magnetized element(s) (106) may each extend along another dimension of the holding sleeve (102) or may each extend along a portion of one or more dimension(s) of the holding sleeve (102). In one or more other embodiments of the invention, a stylus may be magnetized and thus further secured within the holding sleeve lumen (108) via magnetism. In these one or more embodiments, one or more metallic element(s) (106) (that may or may not be magnetized) may be laterally spaced and disposed/embedded within the lining of the holding sleeve (102). The magnetized stylus may then similarly be attracted to the metallic element(s) (106).

In one or more embodiments of the invention, the holding sleeve (102) may enclose the stylus in part or in entirety. To this point, in one or more embodiments of the invention, the length of the holding sleeve (102) may vary in order to conform to the variety of lengths associated with a variety of styli. In another embodiment of the invention, the length of the holding sleeve (102) may be greater than the length of the stylus in order to ensure protection of the whole stylus, including the stylus nib (see e.g., FIG. 1C), which is a part of the stylus that is left exposed and unprotected too often by existing stylus holders or clips today.

In one or more embodiments of the invention, the sleeve base (104A) may be a hollow or solid planar structure that is attached, at one edge, to a corresponding edge of the holding sleeve (102). The sleeve base (104A) includes functionality to fasten the SSA (100) onto a portable computing system (PCS) (see e.g., FIG. 3A), embed the SSA (100) into PCS padfolios or cases (see e.g., FIGS. 3B and 3C), such as into the binding spine of PCS padfolios, and/or otherwise integrate the SSA (100) for employment in other applications. In one or more embodiments of the invention, the sleeve base (104A) may be constructed of semi-rigid and durable materials such as, for example, paperboard, plastics, other synthetic materials, rubbers, silicones, woods, etc. In one or more embodiments of the invention, the sleeve base (104A) and/or the holding sleeve (102) may be sheathed (e.g., covered, padded, etc.) with aesthetic materials that include, but are not limited to: fabric, real and/or imitation leather, carbon fiber, felt, fur, suede, etc.

Figure 1B:
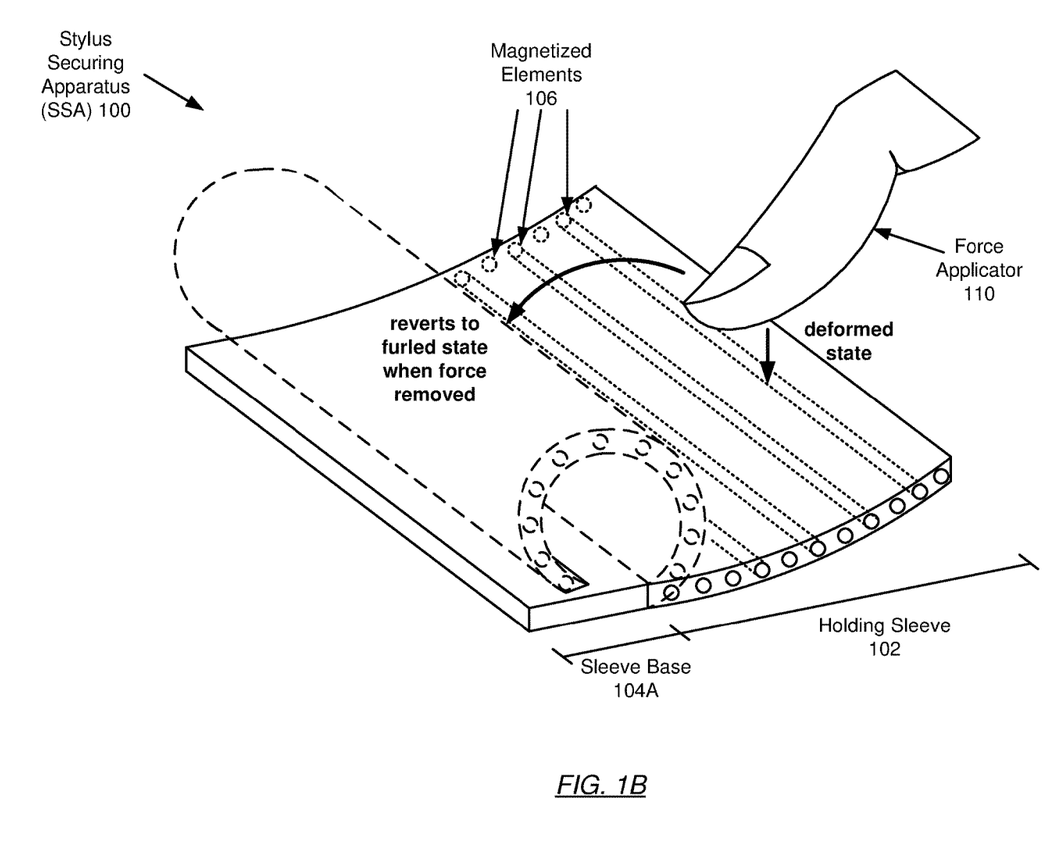
FIG. 1B shows the elastic deformability of a stylus securing apparatus in accordance with one or more embodiments of the invention.

FIG. 1B shows the elastic deformability of a stylus securing apparatus in accordance with one or more embodiments of the invention. As discussed above, elastic deformation pertains to reverting of an object to its original shape once a stress or force is removed, which may have caused a temporary shape change or deformation of the object when it was applied. As illustrated in FIG. 1B, the holding sleeve (102) may transition into a deformed state when a force applicator (110) applies a stress or force onto the holding sleeve (102). Further, upon release or removal of the stress or force, by the force applicator (110), the holding sleeve (102) reverts to its original shape (e.g., the furled state) due to the elastic deformability of the materials used in the construction of the holding sleeve (102).

Figure 1C:
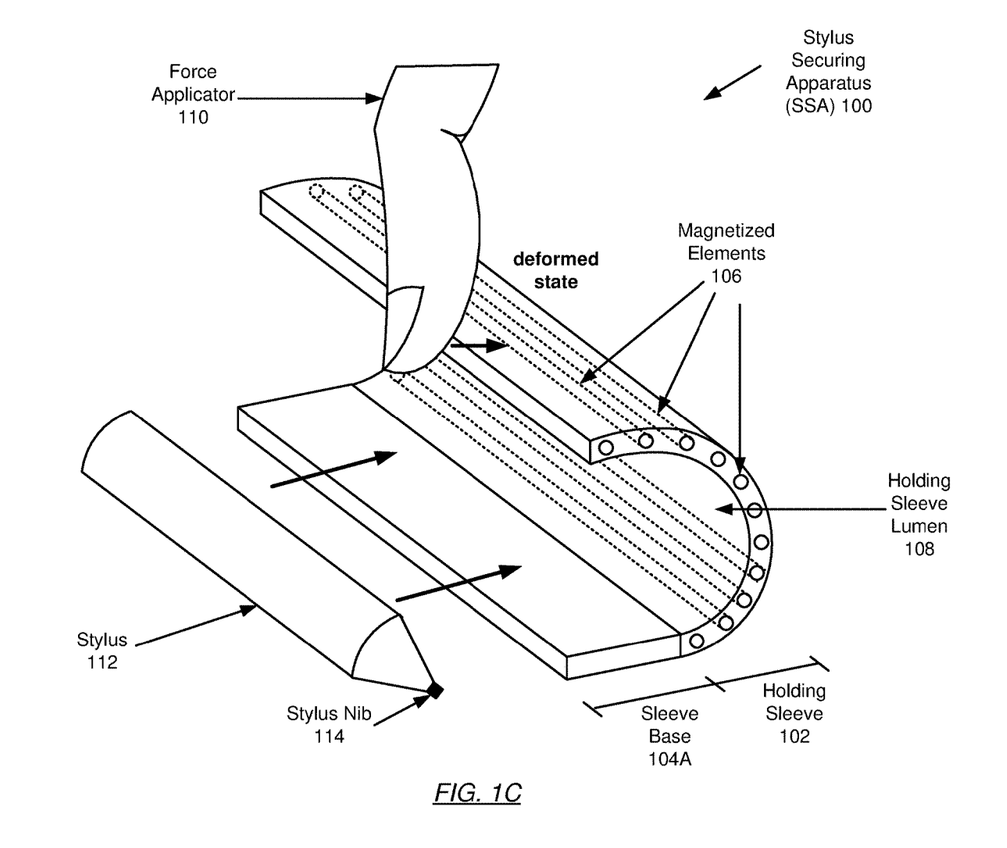
FIG. 1C shows the securing of a stylus within the lumen of a stylus securing apparatus in accordance with one or more embodiments of the invention.

FIG. 1C shows the securing of a stylus within the lumen of a stylus securing apparatus in accordance with one or more embodiments of the invention. Further to elastic deformation, the holding sleeve (102) maintains a deformed state when a stress or force is applied onto the holding sleeve (102) by a force applicator (110). While in a deformed state, the holding sleeve (102) opens up to permit the situating of a stylus (112) within the lumen of the holding sleeve (102). The magnetized element(s), in one or more embodiments of the invention, further secure the stylus within the lumen via magnetism. In one or more embodiments of the invention, once the stress or force is removed, the holding sleeve (102) reverts to its original shape, further enclosing the stylus (112) within its original tubular structure.

Figure 1D:
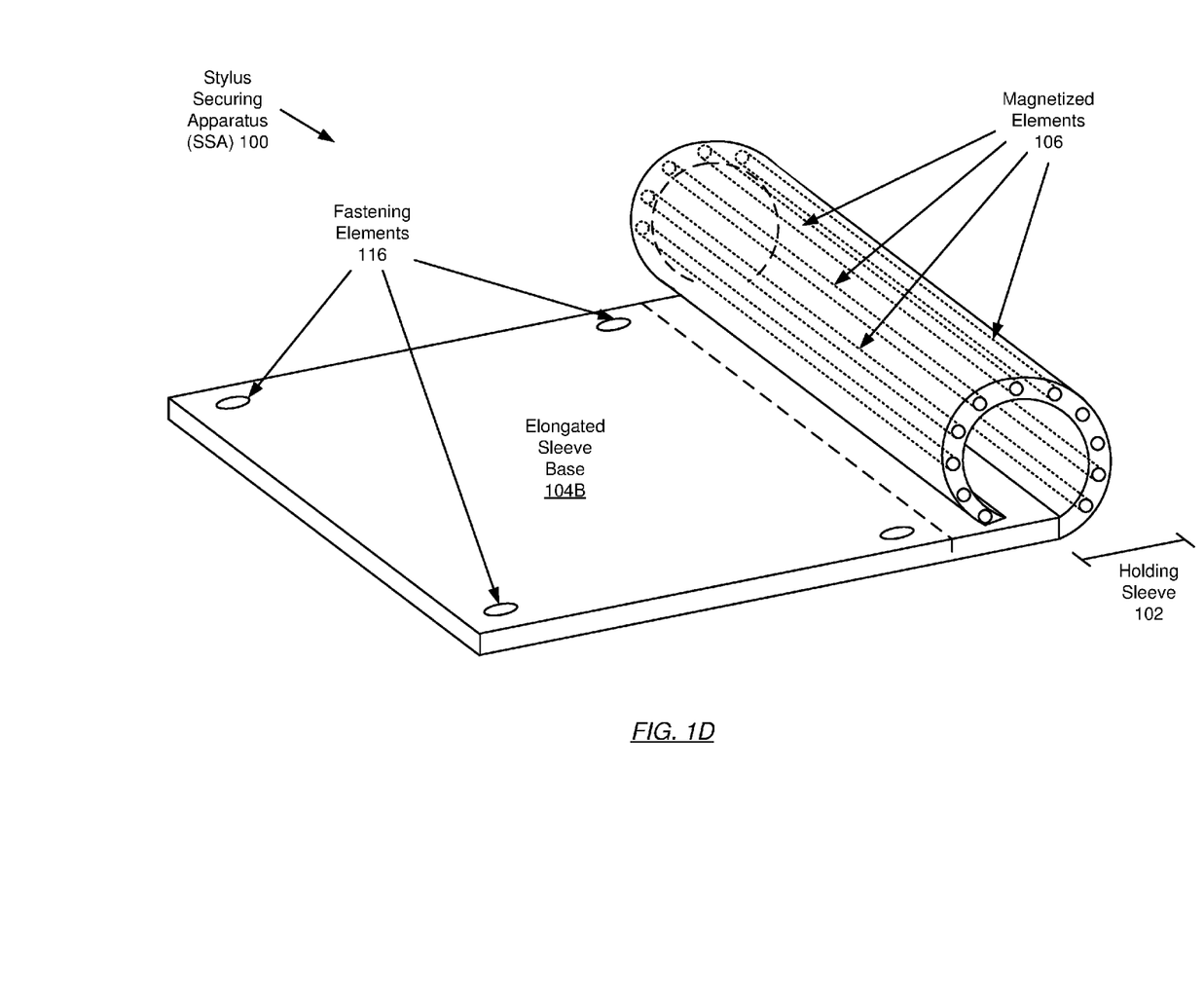
FIG. 1D shows a stylus securing apparatus in accordance with one or more embodiments of the invention.

FIG. 1D shows a stylus securing apparatus in accordance with one or more embodiments of the invention. The stylus securing apparatus (SSA) (100) is substantially similar to the SSA illustrated in FIG. 1A with the exception of an elongated sleeve base (104B) attached to the holding sleeve (102). In one or more embodiments of the invention, an elongated sleeve base (104B) may be used to further facilitate the fastening of the SSA (100) onto a surface of a portable computing system (PCS) (see e.g., FIG. 3A). In one or more embodiments of the invention, one or more fastening element(s) (116) may be affixed on varying positions of a top surface of the elongated sleeve base (104B). Examples of a fastening element include, but are not limited to: a removable adhesive, a removable adhesive putty, a magnet, a hook and loop fastener patch, etc. In one or more embodiments of the invention, the elongated sleeve base (104B) may be integrated into a cavity on a PCS padfolio or case designated for the SSA (100).

Figure 1E:
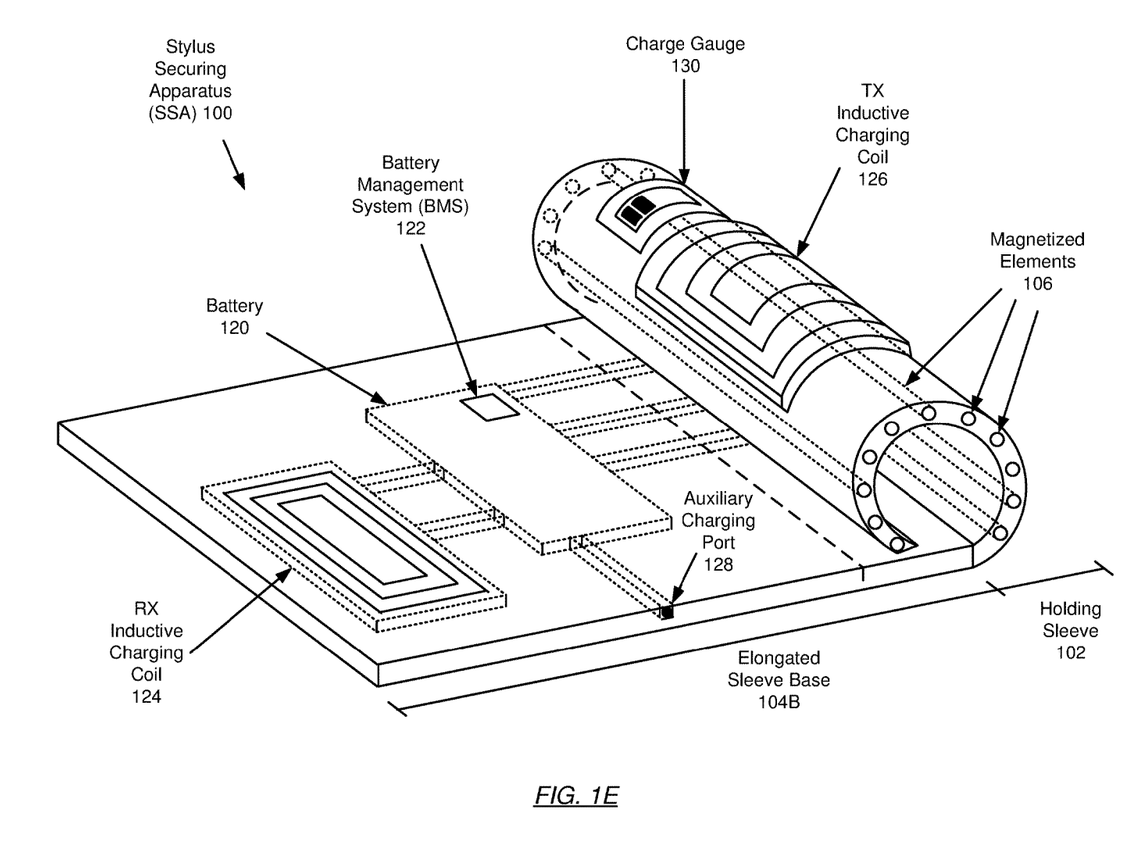
FIG. 1E shows a stylus securing apparatus in accordance with one or more embodiments of the invention.

FIG. 1E shows a stylus securing apparatus in accordance with one or more embodiments of the invention. The stylus securing apparatus (SSA) (100) is substantially similar to the SSA illustrated in FIG. 1D with the exception of various integrated components that bestow the SSA (100) functionality to inductively (or wirelessly) recharge a stylus occupying the lumen of the holding sleeve (102). These various integrated components include a battery (120), a battery management system (BMS) (122), a receiving (RX) inductive charging coil (124), a transmitting (TX) inductive charging coil (126), an auxiliary charging port (128), and a charge gauge (130). Each of these components is described below.

In one or more embodiments of the invention, the SSA (100) may include functionality to generate direct current (DC) utilizing the mechanism of inductive (or wireless) recharging. Inductive recharging refers to the transmission of electrical power (and/or current) without the use of a physical medium through which said electrical power (and/or current) traditionally traverses. In one or more embodiments of the invention, inductive recharging may be implemented using contactless coils (or antennae) capable of converting electrical current into electromagnetic (EM) energy, and vice versa. Particularly, inductive recharging, as performed by the SSA (100), may be conducted as follows: (i) first, voltage from a source, such as the battery (120), may be converted into high frequency alternating current (AC); (ii) next, the AC may be passed through the TX inductive charging coil (126), operatively connected to the source, which generates an EM field; (iii) afterwards, granted an RX inductive charging coil within a stylus (not shown) resides within a specified proximity to the TX inductive charging coil (126) (and hence, the generated EM field), the generated EM field couples into the RX inductive charging coil within the stylus; and (iv) lastly, the DC may be obtained by a destination (e.g., the stylus power circuitry) operatively connected to the RX inductive charging coil within the stylus. In one or more embodiments of the invention, the SSA (100) itself may be inductively recharged through the same series of steps above where the source is an external power source (e.g., an electrical outlet, a portable computing system (PCS) to which the SSA (100) is attached, etc.) and the destination is the battery (120).

In one or more embodiments of the invention, the battery (120) may be any portable direct current (DC) power source used to store and/or provide power/current to the battery management system (BMS) (122) and the TX inductive charging coil (126). Further, the battery (120) refers to a device capable of distributing an appropriate amount of power to each element to which it is operatively connected (utilizing the BMS (discussed below)). Moreover, the battery (120), as mentioned above, may be a device capable of being recharged, wherein DC may be received from the RX inductive charging coil (124) and/or the auxiliary charging port (128). In one or more embodiments of the invention, the battery (120) may be disposed within the lining of the sleeve base (104B). In one or more embodiments of the invention, the battery (120) may include, but is not limited to, one or more nickel cadmium, nickel metal hydride, lithium ion, or any other type of power cell(s).

In one or more embodiments of the invention, the BMS (122) may be operatively connected to the battery (120). In one or more embodiments of the invention, the BMS (122) may include one or more integrated circuit(s) for processing instructions. For example, the BMS (122) may be one or more cores, or micro-cores of a processor. Additionally, or alternatively, processing in the BMS (122) may be performed using an application specific integrated circuit (ASIC), a field programmable gate array (FPGA), or any other type of integrated circuit. Moreover, the BMS (122) may process software instructions, in the form of computer readable program code, relating to the management of the battery (120), the dissemination of electrical power (or direct current (DC)) to components operatively connected to the battery (120), and the measurement/display of the charge capacity associated with the battery (120). Further, in one or more embodiments of the invention, the BMS (122) may include a non-transitory computer readable medium (not shown), such as a storage device, flash memory, physical memory, or any other computer readable storage medium, to which the aforementioned software instructions may be stored, in whole or in part, temporarily or permanently. In one or more embodiments of the invention, the BMS (122) may include one or more sensor(s) (not shown) that include functionality to gather pertinent information (e.g., current, voltage, etc.) necessary towards efficiently charging and discharging DC in order to, for example, prolong the life of the battery (120).

In one or more embodiments of the invention, the receiving (RX) inductive charging coil (124) and the transmitting (TX) inductive charging coil (126) may each be a length of wound-up, insulated copper (and/or silver-plated) wire encapsulated within a thin-walled, non-conductive enclosure. Further, the enclosure may contain a heat sinking element (not shown) through which to dissipate any heat energy produced during the inductive (or wireless) recharging process. In one or more embodiments of the invention, the RX inductive charging coil (124) may include functionality to sense and convert a proximal EM field into DC for use by any component to which it is operatively connected (e.g., battery (120), BMS (122), etc.). In one or more embodiments of the invention, the RX inductive charging coil (124) may be disposed within the lining of the sleeve base (104B). In one or more embodiments of the invention, the TX inductive charging coil (126) may include functionality to receive DC in order to generate an EM field that may couple with an RX inductive charging coil residing on a stylus (or stylus pen). Further, in one or more embodiments of the invention, the TX inductive charging coil (126) may be affixed to the inner surface of the holding sleeve (102). In another embodiment of the invention, the TX inductive charging coil (126) may be affixed to the outer surface of the holding sleeve (102). In yet another embodiment of the invention, the TX inductive charging coil (126) may be disposed within the lining of the holding sleeve (102).

In one or more embodiments of the invention, the auxiliary charging port (128) may be a connector or receptacle through which electrical power (or DC) may recharge the battery (120) via a physical (or wired) medium. In one or more embodiments of the invention, the auxiliary charging port (128) includes functionality to provide an alternative means of recharging the battery (120). The auxiliary charging port (128) may conform to one or more of any number of existing or future developed battery charging standards and/or hardware (e.g., connectors, adapters, etc.). In one or more embodiments of the invention, the auxiliary charging port (128) may be positioned at an edge of the sleeve base (104B) and operatively connected to the battery (120) and/or BMS (122). In one or more embodiments of the invention, the auxiliary charging port (128) may couple to auxiliary charging counterparts available on a PCS or a PCS padfolio/case, and through which DC may be received.

In one or more embodiments of the invention, the charge gauge (130) may be an indicator that provides information pertaining to the battery (120). In one or more embodiments of the invention, the charge gauge (130) may be a visual indicator portraying the level of charge stored in the battery (120) at a given time. In one or more embodiments of the invention, the level of charge may be presented as a percentage of the total charge capacity of the battery (120). By way of an example, the charge gauge (130) may take the form of a bar graph, where the presence of more bars is indicative of more charge stored (or remaining) in the battery (120). In one or more embodiments of the invention, the charge gauge (130) may be affixed to the outer surface of the holding sleeve (102) in order to be visible to a user. In one or more embodiments of the invention, the charge gauge (130) may be operatively connected to the BMS (122) and/or the battery (120), and includes functionality to receive battery pertinent information (e.g., charge capacity, etc.) from the BMS (122).

Figure 2:
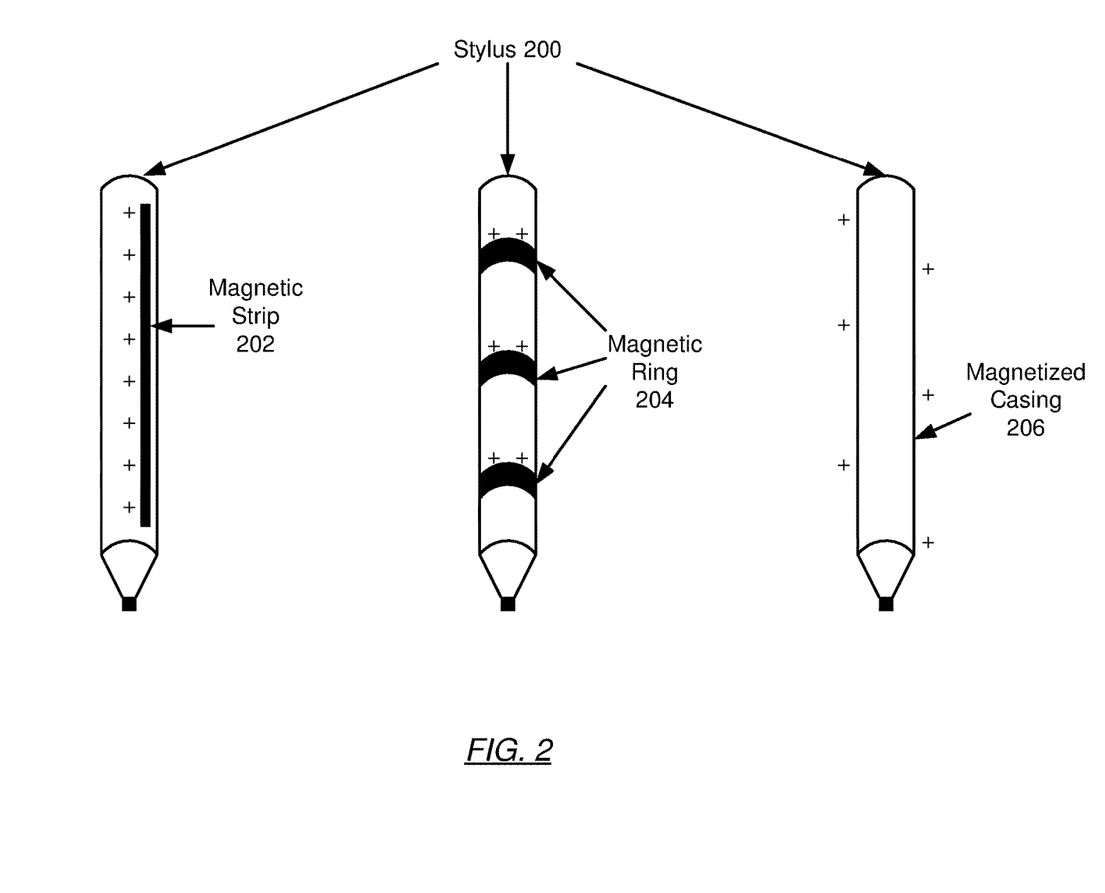
FIG. 2 shows styli in accordance with one or more embodiments of the invention.

FIG. 2 shows styli in accordance with one or more embodiments of the invention. More specifically, the styli depicted show non-limiting examples for the magnetization of a stylus (200) so that the stylus (200) may gain magnetic attraction towards the holding sleeve of the stylus securing apparatus. As such, in one or more embodiments of the invention, one or more adhesive magnetic strip(s) (202) may be embedded within or affixed to a surface of the length of the stylus (200). In another embodiment of the invention, one or more adhesive magnetic ring(s) (204) may be embedded within or affixed to a surface (and spaced along the length) of the stylus (200). In yet another embodiment of the invention, the stylus itself (or casing) (206) may be magnetized through exposure to a strong magnet. Other methods for associating a stylus (200) with magnetic properties may exist and be employed without departing from the scope of the invention.

Figure 3A:
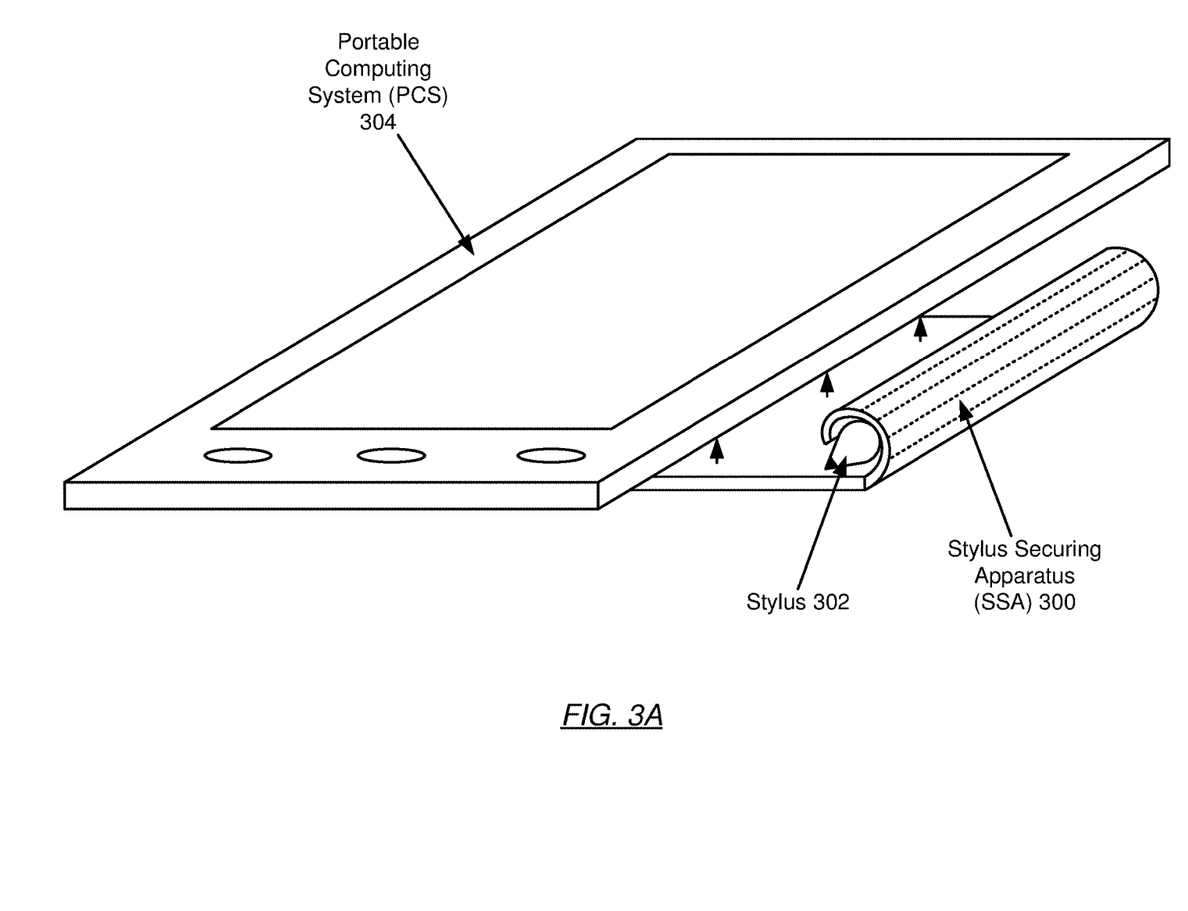
FIGS. 3A-3C show non-limiting exemplary applications of a stylus securing apparatus in accordance with one or more embodiments of the invention.
Figure 3B:
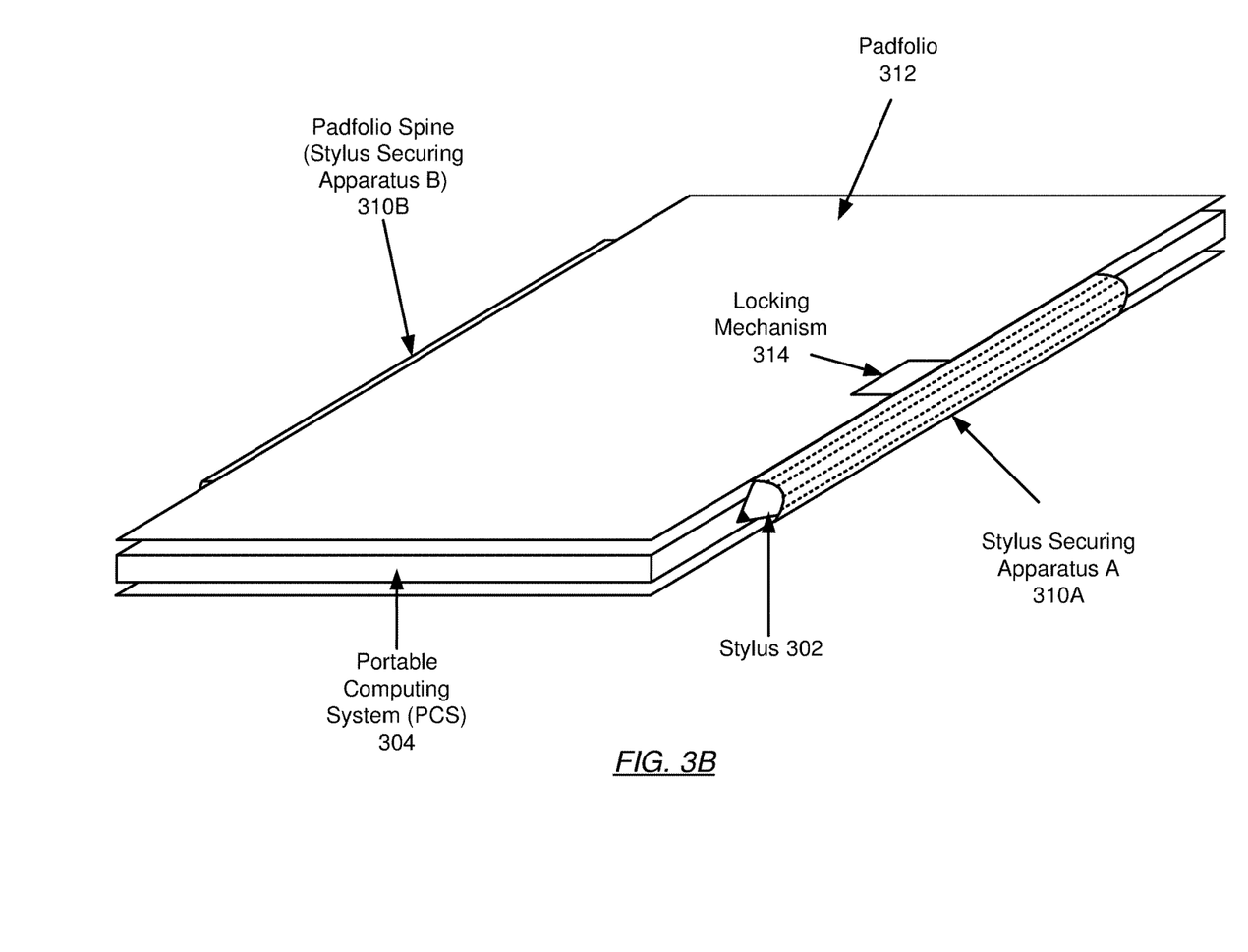
Figure 3C:
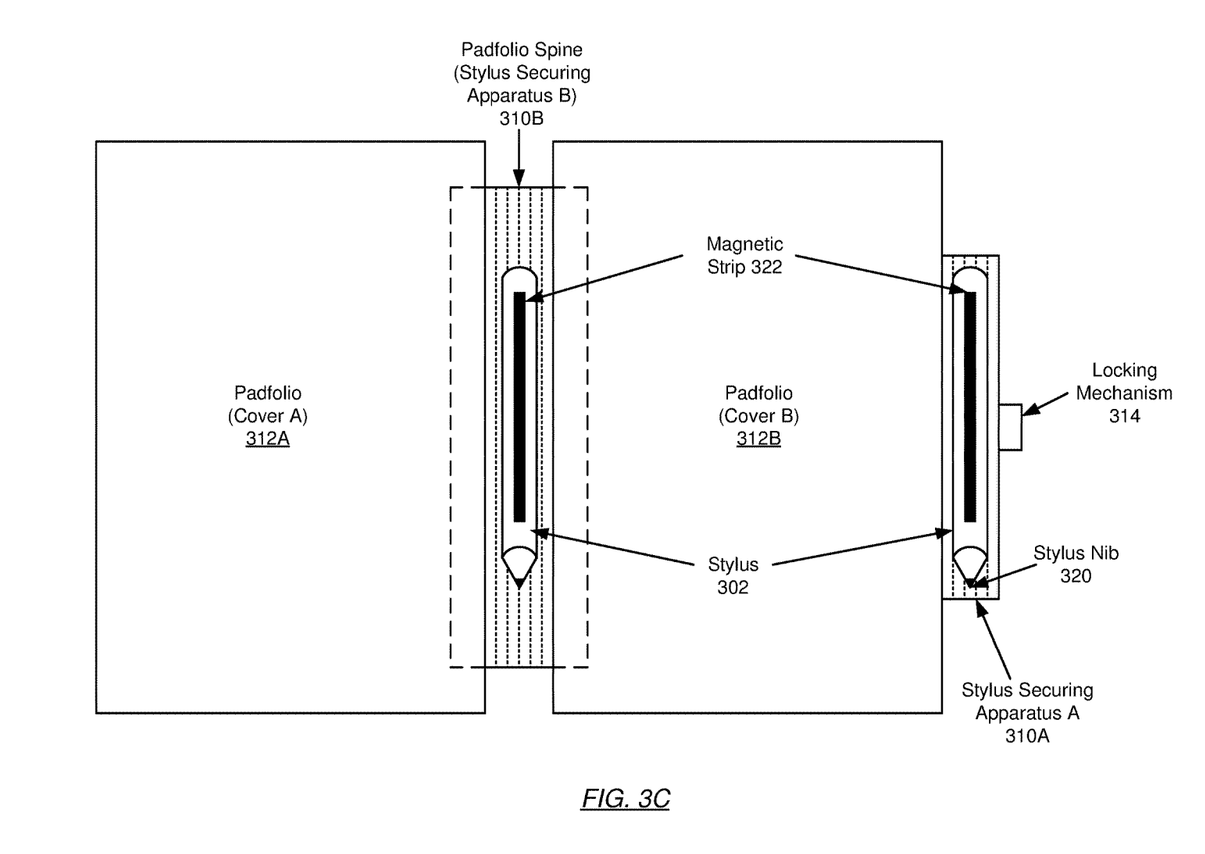

FIGS. 3A-3C show non-limiting exemplary applications of a stylus securing apparatus in accordance with one or more embodiments of the invention. More specifically, FIG. 3A shows an exemplary attachment of the SSA (300) onto a portable computing system (PCS) (304). In the portrayed example, a stylus (302) is enveloped/secured by the SSA (300), whereas the SSA (300) is fastened to the backside (or back surface) of the PCS (304). Though the SSA (300) is shown as being fastened to the right-hand side of the PCS (304), in one or more embodiments of the invention, the SSA (300) may be fastened at any side of the PCS (304) so as to be used by left-handed users, right-handed users, and/or ambidextrous users.

FIGS. 3B and 3C show an exemplary integration of the SSA (310A, 310B) into a padfolio, or a foldable case for protecting and securing a PCS (304). Following the conventional construction of a padfolio (312), the padfolio (312) includes two covers (312A, 312B), a padfolio spine (310B), and often times (or optionally) a fastening or locking mechanism (314) that adjoins the two covers (312A, 312B) together, thereby enclosing the PCS (304) within. Further to this example, one or two stylus securing apparatuses (SSA) (310A, 310B) may be integrated into the padfolio (312) framework. In one or more embodiments of the invention, a first SSA (310A) may be integrated within an outer edge of back padfolio cover (312B). In such an embodiment, the sleeve base may be used as the anchor through which the SSA (310A) may be attached to the aforementioned edge of the back padfolio cover (312B). Additionally, or optionally, in one or more embodiments of the invention, a second SSA (310B) may be integrated within or substitute as the padfolio spine, which includes functionality to bind the two covers (312A, 312B) together. In one or more embodiments of the invention, a locking mechanism (314) may be attached to the edge of the first SSA (310A) opposite the edge integrated/anchored into the back padfolio cover (312B). Examples of the locking mechanism may include, but are not limited to: a buckle, a button, a latch, a strap, a magnet, a press stud, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for securing a stylus, comprising:
  a holding sleeve attached at a first edge to a sleeve base;
  a plurality of magnetized elements laterally spaced and disposed at least partially within a lining of the holding sleeve;
  a transmitting (TX) inductive charging coil;
  a battery operatively connected to the TX inductive charging coil; and
  a receiving (RX) inductive charging coil operatively connected to the battery.

2. The apparatus of claim 1, wherein the holding sleeve is elastic deformable.

3. The apparatus of claim 1, wherein the holding sleeve rests at a furled state as a tubular structure, warps into a deformed state when a force is applied, and reverts back to the furled state when the force is removed.

4. The apparatus of claim 1, wherein the plurality of magnetized elements enable the stylus to be magnetically secured within a lumen of the holding sleeve.

5. The apparatus of claim 1, wherein the battery is rechargeable.

6. The apparatus of claim 1, wherein the TX inductive charging coil is configured to receive direct current (DC) from the battery.

7. The apparatus of claim 1, wherein the battery is configured to receive direct current (DC) from the RX inductive charging coil.

8. The apparatus of claim 1, wherein the battery and the RX inductive charging coil are disposed within a lining of the sleeve base.

9. The apparatus of claim 1, wherein the TX inductive charging coil is affixed to one selected from a group consisting of an outer surface of the holding sleeve and an inner surface of the holding sleeve.

10. The apparatus of claim 1, wherein the TX inductive charging coil is disposed within the lining of the holding sleeve.

11. The apparatus of claim 1, further comprising:
  a battery management system (BMS) integrated into the battery; and
  a charge gauge operatively connected to the BMS.

12. The apparatus of claim 11, wherein the charge gauge is configured to display a current level of charge stored in the battery.

13. The apparatus of claim 11, wherein the charge gauge is affixed to an outer surface of the holding sleeve.

14. The apparatus of claim 1, further comprising:
  a plurality of fastening elements affixed to a top surface of the sleeve base.

15. The apparatus of claim 14, wherein the plurality of fastening elements enable the apparatus to attach to a back surface of a portable computing system (PCS).

16. The apparatus of claim 1, further comprising:
  a locking mechanism attached at a second edge of the holding sleeve, wherein the second edge is oppositely disposed to the first edge.

17. The apparatus of claim 16, wherein the locking mechanism is configured to fasten a pair of covers of a padfolio when the apparatus is integrated into the padfolio.

* * * * *